July 12, 1966 J. H. LUX ETAL 3,260,781
PROCESS FOR THERMOFORMING A SHRINK-RESISTANT
FOAMED POLYSTYRENE CUP
Filed July 2, 1963 2 Sheets-Sheet 1
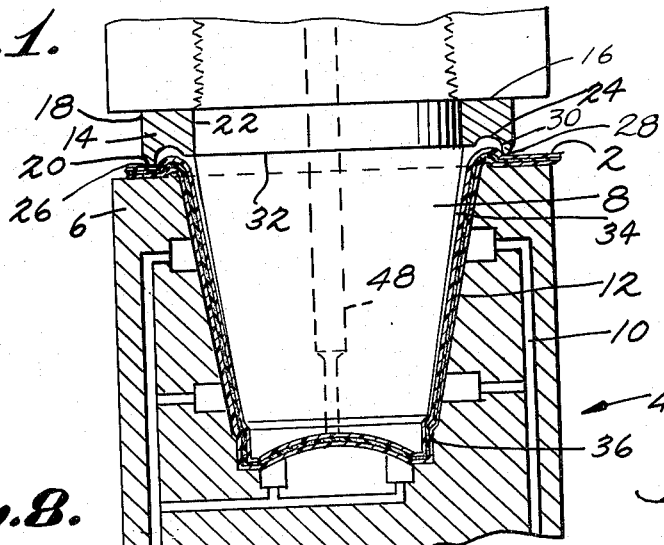
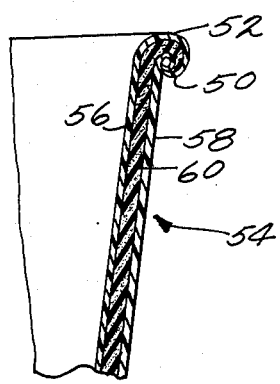
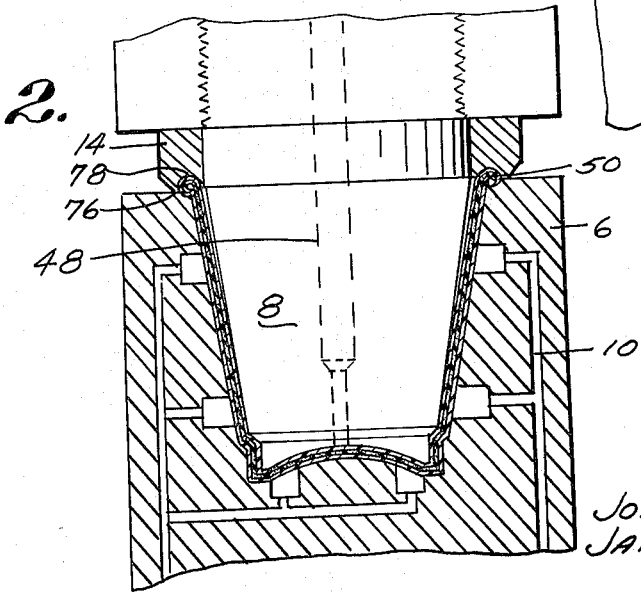
INVENTORS
JOHN H. LUX
JAMES R. TIFFIN
BY Cushman, Darby & Cushman
ATTORNEYS July 12, 1966 J. H. LUX ETAL 3,260,781
PROCESS FOR THERMOFORMING A SHRINK-RESISTANT
FOAMED POLYSTYRENE CUP
Filed July 2, 1963 2 Sheets-Sheet 2
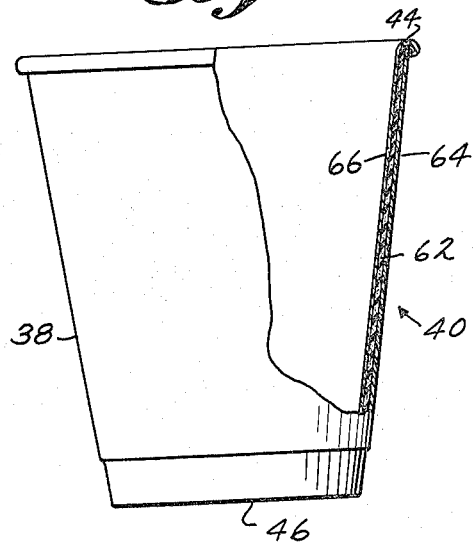
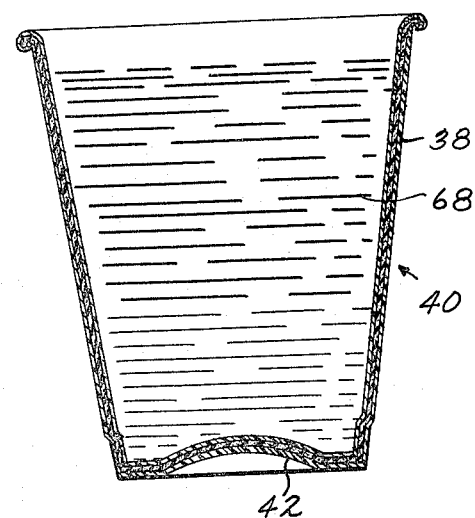
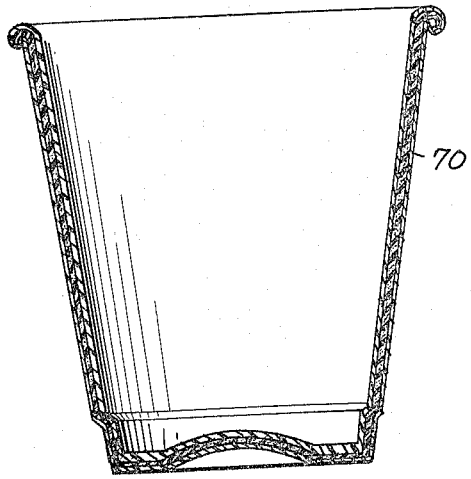
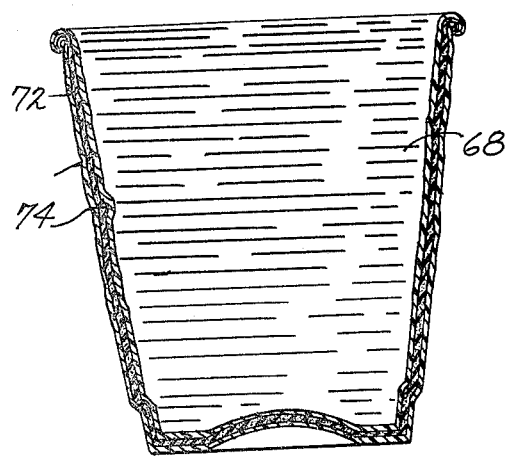
INVENTORS
JOHN H. LUX
JAMES R. TIFFIN
BY Cushman, Darby & Cushman
ATTORNEYS

PROCESS FOR THERMOFORMING A SHRINK-RESISTANT FOAMED POLYSTYRENE CUP

John H. Lux, Charlestown, Md., and James R. Tiffin, Newark, Del., assignors to Haveg Industries, Inc., a wholly-owned subsidiary of Hercules Powder Company, New Castle, Del., a corporation of Delaware
Filed July 2, 1963, Ser. No. 292,374
12 Claims. (Cl. 264—321)

This invention relates to the manufacture of containers from foamed polystyrene and other thermoplastic resins.

It has been proposed to thermoform a foamed plastic cup, e.g., by vacuum forming a foamed polystyrene cup as shown, for example, in Tiffin et al. application Serial No. 261,683, filed February 28, 1963 and now abandoned, and Tiffin et al. application Serial No. 261,993, filed March 1, 1963.

It has been found that when hot liquids are placed in such cups made from relatively low softening plastics, such as polystyrene, frequently there is deformation of the cup due to shrinkage. The cups shorten and exhibit bulges and dimples around the side walls.

It has also been observed that when plastic cups are thermoformed and later a lip is formed by appropriate lip rolling procedure there is undue stress cracking. Apparently, this is due to the fact that permanent stresses are introduced into the region of the lip due to the considerably lower temperature employed in forming the lip than in forming the main portion of the cup.

One of the objects of the invention is to eliminate the deformation of foamed styrene polymer cups when filled with hot liquids, e.f., hot aqueous beverages.

A more specific object is to eliminate such deformation from foamed styrene polymer cups wherein the container consists of (1) a foam resin core, (2) a non-porous, tough resin outer skin and (3) a non-porous, tough resin inner skin, the core being integrally united to the skins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Polystyrene has a softening point of below 90° C. and is normally thermoformed, e.g., vacuum formed, below that temperature, e.g., at 80° C. According to the first feature of the invention, it has been found that deformation of thermoformed styrene polymer cups, when filled with hot beverages, can be eliminated by employing temperatures of at least 205° F. (about 96° C.) in the thermoforming operation. Thus, thermoforming is preferably carried out at temperatures of 212° F. (100° C.) or slightly above, e.g., 230° F. (110° C.) to insure complete absence of shrinkage. The thermoforming should be done at a temperature below that at which the styrene polymer is too fluid to maintain its shape in the mold or to lose its foamed core structure.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, and a copolymer of 99.5% styrene and 0.5% divinyl benzene.

Unless otherwise indicated, all parts and percentages are by weight.

A second aspect of the invention is directed to the elimination of stress cracking along the rim of a foamed plastic cup. This is accomplished by compression molding the lip of the cup to final shape at the same time that the body of the cup is thermoformed, e.g., vacuum formed.

In connection with the formation of the lip during the thermoforming operation, the invention is not limited to styrene polymers. Thus, there can be used, in addition to the styrene polymers set forth above, other foamable thermoplastic resins including cellulose acetate, cellulose acetate-butyrate, homopolymers and interpolymers of monomeric compounds containing the $CH_2=C<$ grouping, such as olefins, e.g., ethylene, propylene, isobutylene, vinyl halides, e.g., vinyl chloride; vinylidene chloride; vinyl esters of carboxylic acids, e.g., vinyl acetate, vinyl stearate, vinyl benzoate, vinyl ethers. e.g., vinyl methyl ether, vinyl ethyl ether, vinyl isobutyl ether; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively non-elastic thermoplastic resins, such as homopolymers and interpolymers of vinyl chloride, homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthylene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, the most preferred resins are thermoplastic styrene polymers containing at least 70% by weight styrene in the structure.

Other suitable thermoplastic resins include polycarbonates, e.g., the polymer from bisphenol A and diphenyl carbonate; polyurethanes, e.g., from toluene diisocyanate and polypropylene glycol molecular weight 2025; Dacron (polyethylene terephthalate), nylon (e.g., polymeric hexamethylene adipamide).

The invention is also of particular value in this second aspect in making foamed cups from polyethylene and polypropylene, as well as ethylene-propylene copolymers (e.g., a 50–50 copolymer). The polyethylene can be of high density, e.g., 0.960, medium density, e.g., 0.935, or low density, e.g., 0.914.

For best results, a nucleating agent should be used in forming the foamed composition from which the cups, buckets or other containers are made.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably, at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent, such as Bayol 35 (a petroleum aliphatic hydrocarbon white oil), kerosene having an average of at least 8 carbon atoms in the molecule, alkylphenolalkylene oxide e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

It has further been found that the best way of incorporating the foaming agent into the polymer is by pre-mixing the pelletized solid thermo-plastic polymer, e.g., polystyrene, with a minor amount of an absorbent having absorbed thereon a volatile liquid (i.e., the foaming agent), which is non-reactive with and which has not more than a slight solvent action on the polymer. The volatile liquid should volatile below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1–15%, preferably 0.5 to 10% by weight of the polymer. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The present invention is particularly useful in preparing high density foams, e.g., foams having a density of 18–45 lbs./cu. ft. and preferably 20–35 lbs./cu. ft.

The free flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder, and extruded in the form of a foamed sheet.

Preferably, the foamed sheet consists of (1) a high density foam resin core, e.g., a density of 18 to 45 lbs./cu. ft. and most preferably, 20 to 35 lbs./cu. ft., (2) a non-porous, tough resin outer skin and (3) a non-porous, tough resin inner skin, the core being integrally united to the skins. The sheet of foamed polymer, e.g., foamed polystyrene, having non-porous inner and outer skins, can be formed in the manner described in Tiffin et al. application Serial No. 261,683, filed February 28, 1963.

In brief, such process comprises extruding a hot sheet of a foamable thermoplastic resin composition, rapidly chilling the outer and inner surfaces only of the sheet to prevent expansion thereof and to form outer and inner skins while permitting the still warm core of the sheet to expand. The chilling can be done with an air blast, for example. The core comprises 50 to 94% of the sheet, with the skins preferably being between 3 and 15% each, although they can be up to 25% of the total thickness.

The thermoforming operation, as indicated, is normally a vacuum forming operation, although the thermoforming apparatus can operate by pressure, i.e., the reverse of vacuum forming.

The invention will be understood best in connection with the drawings wherein:

FIGURE 1 is a vertical elevation partially in section showing a cup thermoforming apparatus;

FIGURE 2 is a view similar to FIGURE 1 but showing a modified apparatus adapted to form a beaded lip;

FIGURE 3 is an enlarged sectional view showing in more detail the beaded lip on the cup prepared in FIGURE 2;

FIGURE 4 is a view partially in section of a cup made according to the invention;

FIGURE 5 is a sectional view of the same cup after being filled with coffee having a temperature of 210° F. (99° C.);

FIGURE 6 is a sectional view of a cup made by thermoforming at a temperature of 200° F. (93° C.) or below;

FIGURE 7 is a sectional view of the cup of FIGURE 6 after being filled with coffee having a temperature of 210° F. (99° C.); and FIGURE 8 is a view of an apparatus for cutting a circular blank from the sheet prior to forming the beaded lip cup as shown in FIGURE 2.

In the drawings like numbers refer to like parts.

Referring more specifically to FIGURE 1 of the drawings (which shows the same apparatus as that shown in FIGURES 4 and 7 of Tiffin et al. application, Serial No. 261,993, filed March 1, 1963) there is provided a sheet 2 of foamed polystyrene. The foamed polystyrene was made by foaming a mixture of 100 parts of composition A, 1 part of pentane absorbed on an equal weight of Celite (i.e., a total of 2 parts of Celite and diatomaceous earth), 0.5 part of Bayol 35, 0.3 part of powdered anhydrous citric acid and 0.4 part of powdered sodium bicarbonate. Composition A is a mixture of 50 parts of high impact polystyrene (Foster Grant's Tuflex 216, polystyrene modified with 5% polybutadiene) and 50 parts of regular crystal polystyrene (Koppers' Dylene 8).

The foamed sheet was 90 mils thick having a top unfoamed skin of 5 mils and a bottom unfoamed skin of 5 mils and a foamed core of 80 mils. The foamed sheet had a density of 25 lbs./cu. ft.

The foamed sheet was heated to 214° F. (101° C.) and then passed over a vacuum cup former designated by the numeral 4. The vacuum former comprises a female die 6 and a male die or plunger 8. The female die 6 has conventional vacuum lines 10 therein and has a frusto-conical, inner surface 12. A suitable vacuum was 14 mm. Hg. (Other degrees of vacuum can be used, e.g., 100 mm. Hg pressure.)

The male die 8 is initially in a position above the sheet 2 and is then moved downwardly to form a cup from the sheet.

Attached directly to the male die 8, in any suitable manner, is a lip former or vacuum assist ring 14. The top wall 16 of the assist ring 14 for convenience is horizontal, although this is not critical. The exterior wall of the assist ring commences in a vertical portion 18, it then tapers downwardly and inwardly at 20, preferably at an angle of 30° with the horizontal. The inner wall 22 of the vacuum assist ring 14 is vertical and shorter than the exterior wall. The bottom wall is designed so as to provide a lip-receiving recess. Commencing at the bottom 26 of the exterior wall, the bottom wall comprises a short horizontal portion 28, a vertical portion 30, a concave arcuate portion 24 and a horizontal portion 32, which terminates at the inner wall 22.

As previously set forth, the vacuum assist ring is attached to the male die or vacuum assist plug 8. The die 8 in the cup-forming section thereof closely follows the contour of the female die 6. Thus, the male die 8 below the vacuum assist ring 14 comprises a downwardly and inwardly tapering frusto-conical portion 34 and terminates in a bottom portion 36 which is preferably corrugated to mate with the bottom of the cup to be formed, so as to provide a simple nesting device. Similarly, the inner wall 12 of the female die 6 preferably terminates at the bottom with mating corrugations to form the nestable cup.

As the sheet 2 of heated, pliable, foamed polystyrene passes over female mold 6, the vacuum assist plug 8 comes down and forces the sheet within the female mold. The vacuum, e.g., 14 mm. is applied through line 10 and the side wall 38 of the cup 40 is formed. Normally, vacuum is applied to the cup side wall 38 before it is applied to the cup bottom wall 42, although the vacuum can be applied to both simultaneously.

The vacuum assist male die 8 has a clearance which is nearly equal to the desired thickness of the product. Substantially simultaneously with the vacuum forming of the frusto-conical side wall 38 of the cup there is compression molded the cup lip 44 and the cup bottom wall 46. The compression molding pressure can be varied widely. A compression molding pressure of 200 p.s.i., for example, is adequate both to form the container lip and the corrugated container bottom.

The vacuum assist male die 8 is preferably designed to include a pressure line 48 to transmit compressed air, e.g., at 2 atmospheres. The air pressure is not critical but can be varied, e.g., between 1.5 and 3 atmospheres or higher. The air pressure forces the foamed polystyrene into the detail of the bottom portion of the female die. This can be done either before, during or after the vacuum transfers the sheet 2 from the male die 8 to the female die 6. Preferably, the vacuum is applied to the cup side wall forming portion before the vacuum is applied to the cup bottom wall forming portion and, hence, the air pressure from the die 8 initiates the transfer of the cup bottom forming section of the sheet 2 from the male die 8 to the female die 6. Then, the vacuum is also applied to the bottom of the cup to assist in completing the formation of the cup. The final forming of the top and bottom walls is by the compression molding, as described.

It will be understood that the vacuum lines can be eliminated entirely and the pressure differential in the thermoforming operation can be maintained by the use of positive pressure, e.g., gas pressure, such as air pressure, issuing at numerous points on the die 8. Alternatively, the entire pressure differential forcing the plastic material against the walls of the female mold can be created by the use of vacuum.

The invention, as illustrated in FIGURES 1 and 2, provides an essentially matched die molding of the critical bottom and top areas of the cup in a thermoforming system. The major wall area of the cup, or other container, is formed, as stated, by the action of pressure forcing the plastic material against the walls of the female mold.

FIGURE 2 shows a cup-forming apparatus similar to that shown in FIGURE 1, except that post molding of a beaded lip is eliminated by directly compression molding a bead 50 on the lip or rim of a foamed polystyrene cup 54 (FIGURE 3). In this form of the invention prior to forming the cup it is necessary to cut a cup blank 49 from the foamed sheet 2. This can be accomplished as shown in FIGURE 8 with the aid of spring-loaded cutting ring 51. The blank can be cut out on top of female die 6 and then the cup formed as shown in FIGURE 2. An annular recess 76 is provided in the female die 6 and the bead is formed between this recess and the recess 78 in the vacuum assist ring 14. It is possible to heat the vacuum assist ring sufficiently so that the plastic in the bead area becomes molten in order to aid in the formation of the bead while the balance of the cup is not heated to this extent.

The foamed cup 52, as indicated, has the foam core 60 and inner and outer skins 56 and 58.

The cup has greater resistance to stress cracking along the rim than cups made under normal lip rolling operations which are carried out subsequently to forming the main portion of the cup and introduce permanent stresses in the region of the lip.

It is not necessary to compression mold the bottom portion of the cup since it can be vacuum-formed, but preferably, as indicated, the bottom is compression molded.

The importance of employing temperatures of 205° F. or above, in thermoforming containers from low softening point styrene polymers is illustrated in FIGURES 4 to 7.

FIGURE 4 shows a cup 40 made by the apparatus of FIGURE 1 using a thermoforming temperature of 214° F. (101° C.). The cup wall 38 comprises a foamed polystyrene core 62, an integral, non-porous, outer wall 64 and an integral, non-porous, inner wall 66 directly united to the core.

FIGURE 5 shows the same cup 40 filled with hot coffee 68, e.g., at 210° F. (99° C.). It will be noted that the cup, including the side wall, is not distorted, shrunk or deformed by the hot liquid. In place of hot coffee, there can be used hot tea, cocoa or even plain water. While FIGURES 4 and 5 show a three-layer foamed polystyrene cup, there can be used a single foamed layer polystyrene cup with the same results. The three-layer foamed cup, however, is preferred for overall operation in the vacuum forming operation and to have a smoother, less absorbent surface on the cup.

FIGURE 6 is a view similar to FIGURE 4 of a cup 70 made by the apparatus of FIGURE 1 using a thermoforming temperature of not over 200° F., e.g., 175° F. The cup is identical in appearance with the cup 40 shown in FIGURE 4. However, when the cup 70 of FIGURE 6 is filled with hot coffee 68, e.g., at 210° F. (99° C.), the cup was distorted and shrunk and deformed. It developed bulges 72 and dimples 74 around the side wall and shortened noticeably, as can be seen in FIGURE 7. It was observed that the greater the reduction in thermoforming temperature below 205° F., the more distorted was the cup by hot aqueous liquids. Also, the lower the thermoforming temperature (when below 205° F.), the lower was the temperature at which distortion commenced.

The thermoforming operation orients and stretches the side wall of the cup.

What is claimed is:

1. In the process of thermoforming a container for hot liquids from a sheet of a foamed styrene polymer, said polymer having a softening point below 90° C., said process including the step of thermoforming by stretching the foamed styrene polymer to form a container side wall, the improvement comprising carrying out the stretching step at a temperature of at least 96° C. and below the temperature at which the foamed core is destroyed and also below the temperature at which the styrene polymer is too fluid to maintain its shape in the mold whereby said container can receive an aqueous liquid at 100° C. without substantial distortion and shrinkage.

2. A process of thermoforming a cup for hot aqueous liquids utilizing a plunger and a female mold comprising heating a single sheet of foamed styrene polymer to a temperature of at least 96° C., said polymer having a softening point of less than 90° C., said sheet consisting of (1) a high density foamed styrene polymer core, (2) a non-porous tough resin outer skin and (3) a non-porous tough resin inner skin, said skins being integrally united to said core, said sheet covering the opening in said mold, inserting at least a portion of said plunger into said female mold and thereby stretching said polymer within said mold to form a container side wall, applying a fluid pressure differential between the side wall of the female mold and the side wall of the plunger while said plunger side wall is within the female mold such that there is a greater pressure on the side wall of the plunger than on the side wall of the female mold, whereby said cup can receive an aqueous liquid at 100° C. without substantial distortion and shrinkage.

3. A process according to claim 2 including compression molding the lip of the container substantially simultaneously with the thermoforming of the container side wall.

4. A process according to claim 3 wherein the thermoforming is carried out by vacuum forming and the compression molding includes the step of forming a bead on the lip of the cup.

5. A method of thermoforming a container utilizing a plunger and a female mold comprising heating a single sheet of foamed plastic, said sheet covering the opening in said mold, inserting at least a portion of said plunger in said female mold and thereby stretching said plastic within said mold to form a container side wall, cutting the individual container material from the rest of the original sheet, compression molding the lip of the container from said heated sheet while simultaneously forming an external bead on the rim of said lip, said compression molding being between said female mold and a mating portion of said plunger, and applying a fluid pressure differential between the side wall of the female mold and the side wall of the plunger while said plunger side wall is within said female mold such that there is a greater pressure on the side wall of the plunger than on the side wall of the female mold.

6. A method according to claim 5 wherein the thermoforming is carried out by vacuum forming.

7. A method according to claim 6 wherein the foamed plastic is a styrene polymer.

8. A method according to claim 7 wherein the sheet consists of (1) a high density foamed styrene polymer core, (2) a non-porous tough resin outer skin and (3) a non-porous tough resin inner skin, said skins being integrally united to said core.

9. A process according to claim 1 wherein the stretching is carried out at a temperature above 100° C. and not over 110° C.

10. A process according to claim 2 wherein said heating is carried out at a temperature between 96 and 110° C.

11. A process according to claim 10 wherein the styrene polymer core has a density of between 18 and 45 lbs./cu. ft.

12. A process according to claim 2 including compression molding the lip of the container simultaneously with the thermoforming of the container side wall and wherein the heating is at a temperature between 96 and 110° C. and the foamed styrene polymer core has a density of 18 to 45 lbs./cu. ft.

References Cited by the Examiner

UNITED STATES PATENTS

| | | | |
|---|---|---|---|
| 2,384,387 | 9/1945 | Meyer | 264—321 |
| 2,667,422 | 1/1954 | Kauffman | 99—171 |
| 2,667,423 | 1/1954 | Simpson | 99—171 |
| 2,764,436 | 10/1956 | Noland et al. | 264—321 |
| 2,893,877 | 7/1959 | Nickolls | 264—48 XR |
| 2,942,301 | 6/1960 | Price et al. | 264—51 XR |
| 2,953,814 | 9/1960 | Mumford | 264—92 XR |
| 3,011,212 | 12/1961 | Marshall et al. | 18—19 XR |
| 3,019,488 | 2/1962 | Doyle et al. | 264—90 |
| 3,039,911 | 6/1962 | Fox | 264—321 XR |
| 3,042,972 | 7/1962 | Lafferty | 264—92 XR |
| 3,045,286 | 7/1962 | Harrison | 264—321 XR |
| 3,105,270 | 10/1963 | Fibish | 18—19 |
| 3,137,747 | 6/1964 | Kline | 264—92 |
| 3,168,207 | 2/1965 | Noland et al. | 264—48 XR |

FOREIGN PATENTS

| | | |
|---|---|---|
| 582,122 | 8/1959 | Canada. |
| 854,586 | 11/1960 | Great Britain. |
| 903,986 | 8/1962 | Great Britain. |

OTHER REFERENCES

SPE Journal, "Controlled Density Polystyrene Foam Extrusion," July 1960, pp. 705–709.

ALEXANDER H. BRODMERKEL, *Primary Examiner.*

R. N. JONES, P. E. ANDERSON, *Assistant Examiners.*